United States Patent [19]

Svensson

[11] Patent Number: 4,803,602
[45] Date of Patent: Feb. 7, 1989

[54] SUN VISOR WITH ILLUMINATED MIRROR

[75] Inventor: E. Gunnar Svensson, Malung, Sweden

[73] Assignee: Autopart Sweden AB, Malung, Sweden

[21] Appl. No.: 108,012

[22] Filed: Oct. 14, 1987

[30] Foreign Application Priority Data

Oct. 24, 1986 [SE] Sweden .............................. 8604556

[51] Int. Cl.⁴ ............................................ F21V 33/00
[52] U.S. Cl. ..................................... 362/135; 362/141
[58] Field of Search ................ 362/135, 66, 364, 365, 362/366, 372, 141

[56]  References Cited

U.S. PATENT DOCUMENTS

| 2,123,319 | 7/1938 | Thompson | 362/141 |
| 4,000,404 | 12/1976 | Marcus | 362/135 |
| 4,213,169 | 7/1980 | Kempkers | 362/141 |
| 4,227,241 | 10/1980 | Marcus | 362/135 |
| 4,648,011 | 3/1987 | Boote et al. | 362/135 |
| 4,652,982 | 3/1987 | Flourday | 362/135 |
| 4,683,522 | 7/1987 | Viertel et al. | 362/135 |
| 4,710,856 | 12/1987 | Cheung | 362/135 |

FOREIGN PATENT DOCUMENTS

WO85/00028  1/1985  Int'l Pat. Institute ............. 362/135

Primary Examiner—Raymond A. Nelli
Attorney, Agent, or Firm—Young & Thompson

[57] ABSTRACT

The present invention relates to a sun visor for vehicles, which is provided with an illuminated mirror. The invention relates in particular to simplified manufacture of such sun visors. According to the invention, the mirror unit consists only of a mirror plate (1) with openings (2,3), of units (4) consisting of lamp holders (6) and prisms (5), said units being pressed into said openings, and of contact means for supplying electric current to the lamp of the illuminating units.

5 Claims, 3 Drawing Sheets

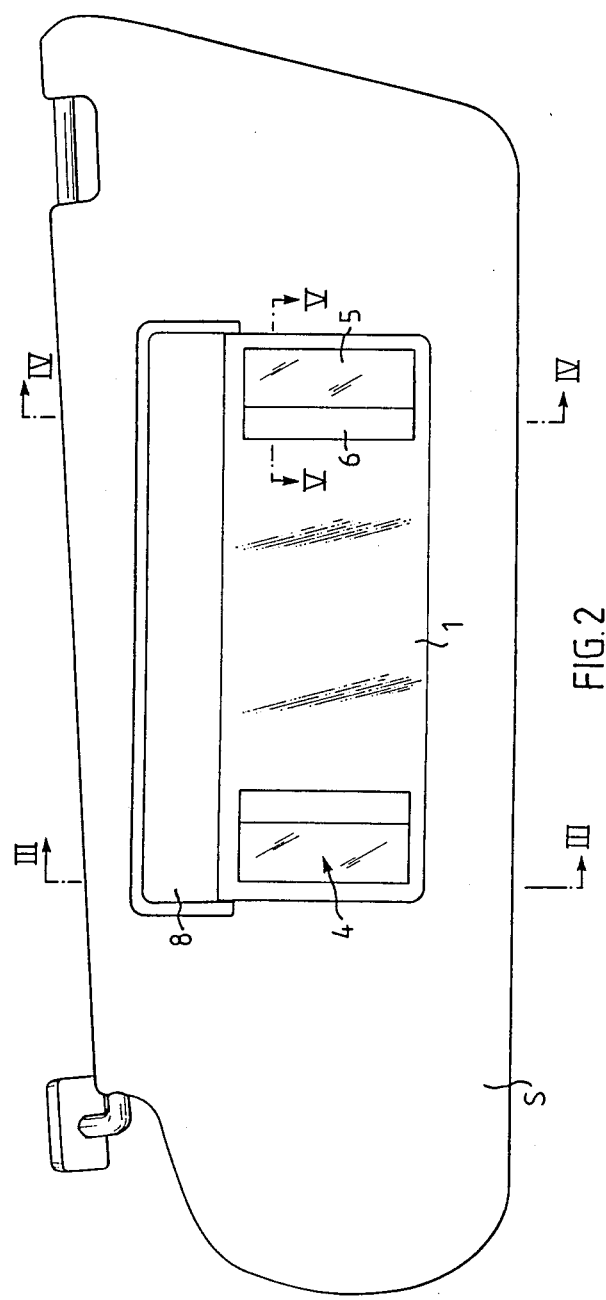

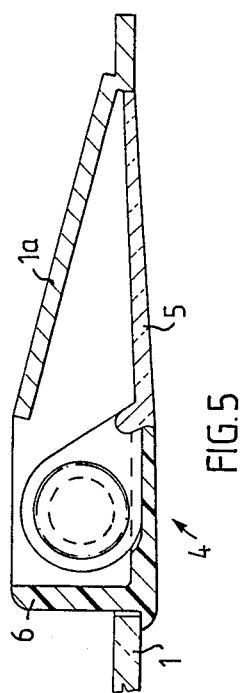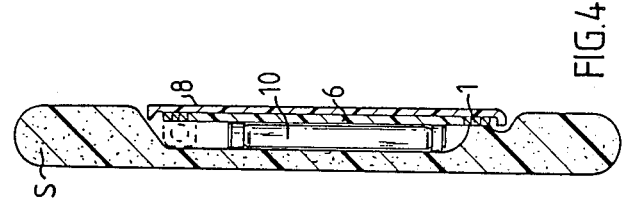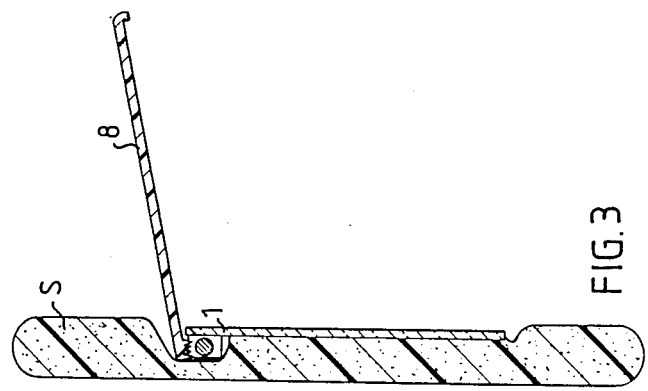

SUN VISOR WITH ILLUMINATED MIRROR

BACKGROUND OF THE INVENTION

The present invention relates to a sun visor for vehicles which is provided with an illuminated mirror.

BRIEF DESCRIPTION OF THE PRIOR ART

Such mirror units often have a complicated structure with many component parts thus resulting in high manufacturing and assembly costs.

The present invention has the purpose of reducing these costs by achieving an easily manufactured and easily assembled mirror unit with few component parts. One step in this direction has already been taken as described in the publication WO No. 85/00028, which reveals a mirror unit in which the lamps of the illuminating unit are arranged in a recessed portion of the plate constituting the mirror. These lamps are partially supported by the plate.

SUMMARY OF THE INVENTION

According to the invention, there is achieved an additional simplification of the construction of such a sun visor. Since the mirror is self-supporting, no frame is needed to stabilize it and by virtue of the fact that the prism with integrated lamp holders in the illumination unit are pressed into the opening in the mirror, an elegant mounting of the lamps is achieved.

BRIEF DESCRIPTION OF THE FIGURES

These and other characteristics and advantages will become evident from the following detailed description of an example of the invention with reference to the accompanying drawings, of which:

FIG. 2 shows a sun visor according to the invention, FIG. 3 shows a section along the line III—III in FIG. 2, FIG. 4 shows a section along the line IV—IV in FIG. 2, and FIG. 5 shows a section along the line V—V in FIG. 2.

DETAILED DESCRIPTION

Figure 1:
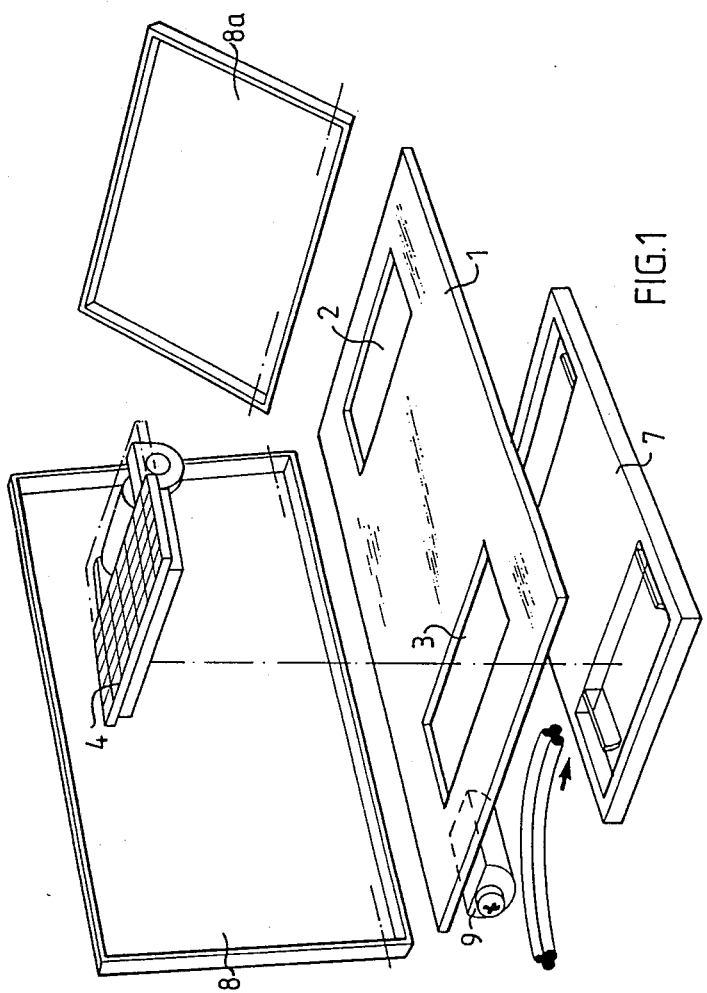
FIG. 1 shows schematically the mirror unit according to the invention in an exploded view.

The mirror unit shown schematically in FIG. 1 consists of a mirror plate 1 of highly polished sheet metal for example. The plate 1 contains two openings 2,3, in which units 4 consisting of a prism 5 and a lamp holder unit 6 are pressed. Reference numeral 7 indicates a current supply unit and 8 and 8a indicates covers hinged to the upper longitudinal side of the mirror plate and its short sides, respectively, by means of hinges 9, which are suitably fixed by gluing, for example, to the back of the plate 1. A precondition for being able to use the structure shown in FIG. 1 is that the plate 1 be self-supporting and also sufficiently rigid to be able to support the cover 8 or covers 8a without being deformed. If the plate 1 is made of sheet metal, it can also be used as a conductor for simplifying wiring. In this case, one of the connection terminals is the plate itself, for example by a local continuation of the inwardly bent stamped out portion 1a at the level of the lower end of the lamp 10. The other contact terminal including the positive wire is connected in a suitable manner to the back of the mirror plate with a portion extending into the area behind the openings 2,3. Furthermore, a switch (not shown) is arranged which is actuated in a suitable manner by the closing and opening of the cover to break and complete the current circuit.

FIGS. 2–5 shows schematically the device according to the invention. As can be seen from these figures, the mirror plate 1 is fixed in a recess in the sun visor S, preferably by gluing. The recess for the sun visor is deeper both in its upper portion to accommodate the cover 8 and its hinge mechanism, as can be seen in FIG. 3, and behind the openings 2,3 in the mirror plate 1 to provide space for the illumination units 4 (see FIG. 4) as well as between the upper ends of the deeper recesses for the lamps to provide space for the positive contact terminal extending along the back of the mirror plate between the upper ends of the lamps 10 being fixed to and electrically insulated from the mirror back.

FIG. 5 shows in larger scale one variant of the unit 4 to be pressed into the openings 2,3. The unit consists of a prism 5 and a lamp holder-shade 6. Reference numeral 1a designates an inwardly bent portion of the mirror plate 1, which portion functions as a reflector in the illumination unit. By virtue of the fact that the lamp 10 is placed to one side of the prism 5, only indirect light will leave the prism.

It is evident from FIG. 1 that a special current supply unit 7 can be used instead of the previously described wiring system, for example if the mirror plate is not made of conducting material.

The invention thus provides a sun visor with an illuminated mirror with a small number of components. The mirror unit is quite inexpensive to manufacture and simple to assemble. Furthermore, it is quite simple to replace burnt out lamps because the prisms are easily pulled out of the openings in the mirror plate. Finally, the mirror plate is rigid enough so that it can support a hinged cover without being deformed.

Modifications of the embodiment shown are of course conceivable within the scope of the invention. For example, the mirror plate need not support a cover, and the openings and thus the units consisting of lamp holder and prism can have other shapes than the rectangular shape shown. The scope of the invention is thus only limited by the attached patent claims.

I claim:

1. An illuminated frameless mirror for a vehicle sun visor, comprising
    (a) a self supporting planar mirror plate having a reflective surface and containing at least one opening;
    (b) a unitary illumination device arranged in said mirror plate opening and removably connected therewith, said illumination device including
        (1) a lamp holder containing an illumination lamp;
        (2) a prism arranged adjacent the lamp of said lamp holder, the light from said illumination lamp being transmitted from said illumination unit via said prism to provide indirect illumination to the user; and
    (c) electrical contact means connected with said illumination unit for supplying electrical energy to said illumination lamp.

2. A sun visor mirror as defined in claim 1, and further comprising at least one cover and hinge means for connecting said cover with said mirror plate, one portion of said hinge means being connected with the rear of said mirror plate.

3. A sun visor mirror as defined in claim 1, wherein said mirror plate is formed of polished sheet metal.

4. A sun visor mirror as defined in claim 3, wherein said mirror plate comprises an electrical conductor.

5. A sun visor mirror as defined in claim 4, wherein said at least one mirror plate opening is formed by bending a stamped-out portion from the plane of said reflective surface, said stamped-out portion comprising an electrical contact terminal for said illumination device.

* * * * *